United States Patent
Stanczak et al.

[19]

[11] Patent Number: 5,903,217
[45] Date of Patent: May 11, 1999

[54] MICRO MOTION SENSOR

[75] Inventors: Mark S. Stanczak, Eastpointe; Ricky J. Ladd, Brooklyn; Robert S. Rau, Ypsilanti; Gary L. Miller, Plymouth, all of Mich.

[73] Assignee: Microwave Sensors, Inc., Ann Arbor, Mich.

[21] Appl. No.: 08/954,532

[22] Filed: Oct. 21, 1997

[51] Int. Cl.$^6$ ................................................... G08B 13/18
[52] U.S. Cl. ........................ 340/554; 340/545.3; 340/552; 342/28
[58] Field of Search ...................... 340/521, 540, 340/541, 545, 552, 554, 572, 573, 572.2, 572.4, 573.1, 573.3, 573.7, 545.1, 545.3; 342/27, 28, 127

[56] References Cited

U.S. PATENT DOCUMENTS

| | | | |
|---|---|---|---|
| 3,750,171 | 7/1973 | Faris | 342/127 |
| 3,750,172 | 7/1973 | Tresselt | 342/28 |
| 3,766,554 | 10/1973 | Tresselt | 342/28 |
| 3,832,709 | 8/1974 | Klein et al. | 342/127 |
| 4,961,039 | 10/1990 | Yamauchi et al. | 340/554 |
| 5,097,268 | 3/1992 | Bauer, Jr. et al. | 342/160 |
| 5,150,123 | 9/1992 | Orlowski et al. | 342/28 |
| 5,196,826 | 3/1993 | Whiting | 340/554 |
| 5,223,817 | 6/1993 | Hoyle | 340/554 |
| 5,266,954 | 11/1993 | Orlowski et al. | 342/69 |
| 5,481,266 | 1/1996 | Davis | 342/28 |
| 5,557,281 | 9/1996 | O'Connor | 342/114 |

Primary Examiner—Jeffery A. Hofsass
Assistant Examiner—Van T. Trieu
Attorney, Agent, or Firm—Harness, Dickey & Pierce, P.L.C.

[57] ABSTRACT

A microwave motion sensor for detecting multiple levels of motion of a target is disclosed. The motion sensor includes a transceiver for broadcasting a signal into a predetermined area and receiving a reflected signal with a receiver for producing first and second directional signals. A signal conditioning circuit is provided for amplifying the first and second directional signals and digitizing the directional signals. The signal conditioning circuit includes a micro motion amplifier for separately amplifying one of the directional signals and producing a micro motion signal. A processor is provided for receiving the first and second directional signals transmitted by the signal conditioning circuit, and for receiving the micro motion signal. The processor includes a circuit for analyzing the directional signals, and a circuit for comparing the micro motion signal to a threshold. The processor is capable of adaptively switching between a first mode for detecting a threshold level of motion, a second mode for detecting a level of motion which is less than the threshold level of motion, and a third mode for detecting a level of motion which is greater than the threshold level of motion.

20 Claims, 7 Drawing Sheets

MICRO MOTION SENSOR

BACKGROUND OF THE INVENTION

1. Technical Field

The present invention relates to a motion sensing apparatus, and more particularly to a microwave based motion sensing apparatus wherein a single microwave sensor is employed for detecting multiple levels of motion.

2. Discussion

Motion sensors are presently employed in a wide variety of applications. Many of these motion sensors are based upon a microwave transceiver which emits and analyzes microwave signals in the 24 GHz range. An exemplary application is the use of a motion sensor for automatically opening a doorway as the motion of a pedestrian or vehicle approaching the doorway is detected. Once the pedestrian or vehicle is detected within the operating range of the motion sensor, the doorway is automatically opened and maintained in the open state for a predetermined amount of time, or until no more motion is detected.

The motion sensors known within the prior art generally work well for detecting the initial level of motion for triggering an event such as opening the doorway. Typically, these motion sensors operate at a single threshold level and are unable to adapt to different operating conditions, or switch between various operating modes for detecting multiple levels of motion. The current ANSI standard for detecting motion sets the minimum motion threshold at a rate of two inches of motion per second in a direction normal to the motion sensor. Motion detectors adopting this standard must be able to detect motion at this minimum level for triggering an event such as opening the door.

Additionally, various problems and challenges arise once the motion sensor has initially opened the doorway. For example, the doorway must be maintained in the open position until the pedestrian or vehicle passes completely through the doorway. A pedestrian will typically approach the doorway more slowly than a motorized vehicle. Additionally, the physical condition of the pedestrian may dictate the amount of time it takes to pass completely through the doorway. The motion sensor must also account for both large adults and small children moving at various speeds as they approach the doorway.

One method for detecting very small levels of motion is to provide a second separate sensing device for detecting whether the pedestrian or vehicle is present or moving within the doorway or range of the door. The second sensor operates at a more sensitive motion threshold. As such, the door can be maintained in the open state until the secondary sensor detects that the door threshold or doorway is clear. For example, a pressure sensitive walkway can be installed for operating in conjunction with the motion sensor so that the presence of a pedestrian would prevent the door from closing. Alternatively, an infrared beam of light can be transmitted across the doorway to a receiving sensor for detecting the presence of a person or vehicle within the doorway.

Another solution found within the prior art is the use of a second microwave or infrared based sensor for detecting presence or smaller levels of motion within the door threshold or the range of the door after the primary motion sensor has opened the door. However, the second sensor must operate so that motion of the closing door will not again trigger the reopening of the door. Several techniques have been developed for successfully implementing such a device. However, these techniques still require two individual sensors for detecting multiple levels of motion, or at least the combination of one microwave sensor and a secondary sensing device as discussed above. Additionally, the employment of two separate sensors for detecting multiple levels of motion increases the cost of providing automatic doors, increases the complexity of the overall system operation and maintenance, and requires more complex control algorithms for safely and efficiently operating the automated doorway.

Accordingly, it is desirable to provide a motion sensing system utilizing a single microwave based motion sensing unit which is capable of both detecting the initial motion of an approaching target, and continue monitoring for significantly smaller levels of motion as the target continues approaching the doorway. Such a device would provide a motion sensor which automatically changes between multiple operating modes. It is further desirable to provide a system having a single motion sensor which can adaptively adjust the level or threshold of motion detected for sensing varying levels of motion of a pedestrian approaching the doorway. Finally, it is desirable to provide a motion sensing apparatus which is unaffected by the false motion of a closing door inadvertently triggering the reopening of the doorway.

SUMMARY OF THE INVENTION

In accordance with the present invention, a microwave motion sensor for detecting multiple levels of motion of a target is disclosed. The motion sensor includes a transceiver for broadcasting a signal into a predetermined area and receiving a reflected signal with a receiver for producing first and second directional signals. A signal conditioning circuit is provided for amplifying the first and second directional signals and digitizing the directional signals. The signal conditioning circuit includes a micro motion amplifier for separately amplifying one of the directional signals and producing a micro motion signal. A processor is also included having means for receiving the first and second directional signals transmitted by the signal conditioning circuit, means for receiving the micro motion signal, means for analyzing the directional signals, and means for comparing the micro motion signal to a threshold. The processor is capable of adaptively switching between a first mode for detecting a threshold level of motion and a second mode for detecting a level of motion which is less than the threshold level of motion. In one embodiment, the processor may switch into a third mode for detecting a level of motion which is greater than the threshold level of motion.

BRIEF DESCRIPTION OF THE DRAWINGS

The various advantages of the present invention will become apparent to one skilled in the art by reading the following specification and appended claims and by referencing the following drawings in which:

DETAILED DESCRIPTION OF THE INVENTION

In accordance with the teachings of the present invention, a microwave based motion sensor is disclosed which is particularly well suited for controlling an automatic doorway in response to motion toward or away from the doorway. The motion sensor of the present invention is also suitable for traffic control and pedestrian crossing applications. More specifically, the motion sensor can be used for detecting motion of vehicular traffic toward or away from a traffic detection point or traffic intersection. Alternatively, the motion sensor can be used for detecting a pedestrian approaching a crosswalk and controlling the crossing and traffic signals, or for detecting a pedestrian moving within the marked crosswalk. However, it should be understood from the outset that the motion sensor of the present invention is readily adaptable to a variety of applications including, but not limited to, entry doors, garage doors, automatic gates, and safety zone detection around dangerous machinery. The motion sensor described herein can also be used in security applications.

Figure 1:
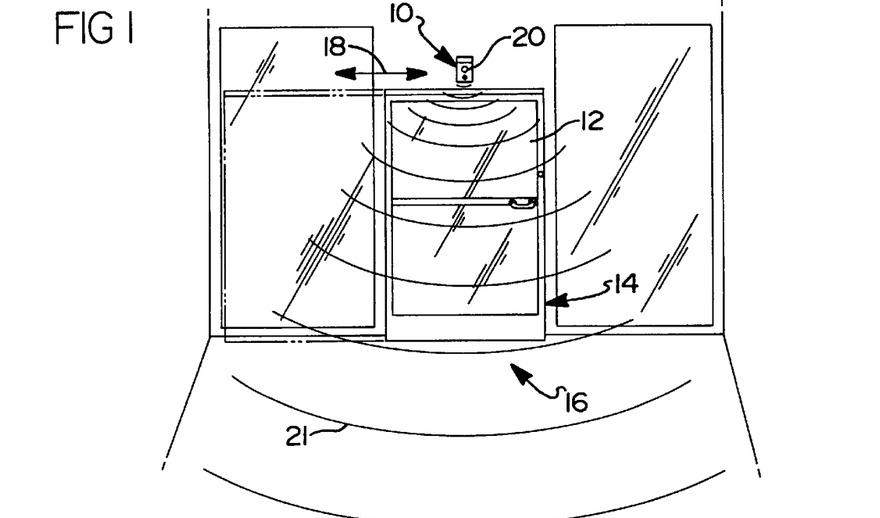
FIG. 1 is an environmental view of an exemplary automatic doorway which is compatible with the motion sensor in accordance with a preferred embodiment of the present invention.

Referring now to FIG. 1, the motion sensor 10 associated with the preferred embodiment of the present invention is disclosed in conjunction with an automatic door 12. The exemplary automatic door 12 opens across a doorway 14 which may be approached by a target such as a pedestrian moving along a walkway 16. Arrow 18 indicates the lateral sliding motion of automatic door 12. Motion sensor 10 emits a microwave signal 21 which is broadcast within doorway 14 and also into a predetermined area in front of door 12 and around walkway 16. Upon receiving and analyzing the appropriate signal reflected from the target, motion sensor 10 controls a relay 60 for activating and deactivating an actuator or motor (not shown) for automatically opening and closing automatic door 12. As will be appreciated, motion sensor 10 is capable of detecting the motion of a pedestrian or target moving toward or away from door 12 at standard speeds, as well as moving at very slow speeds.

Figure 2:
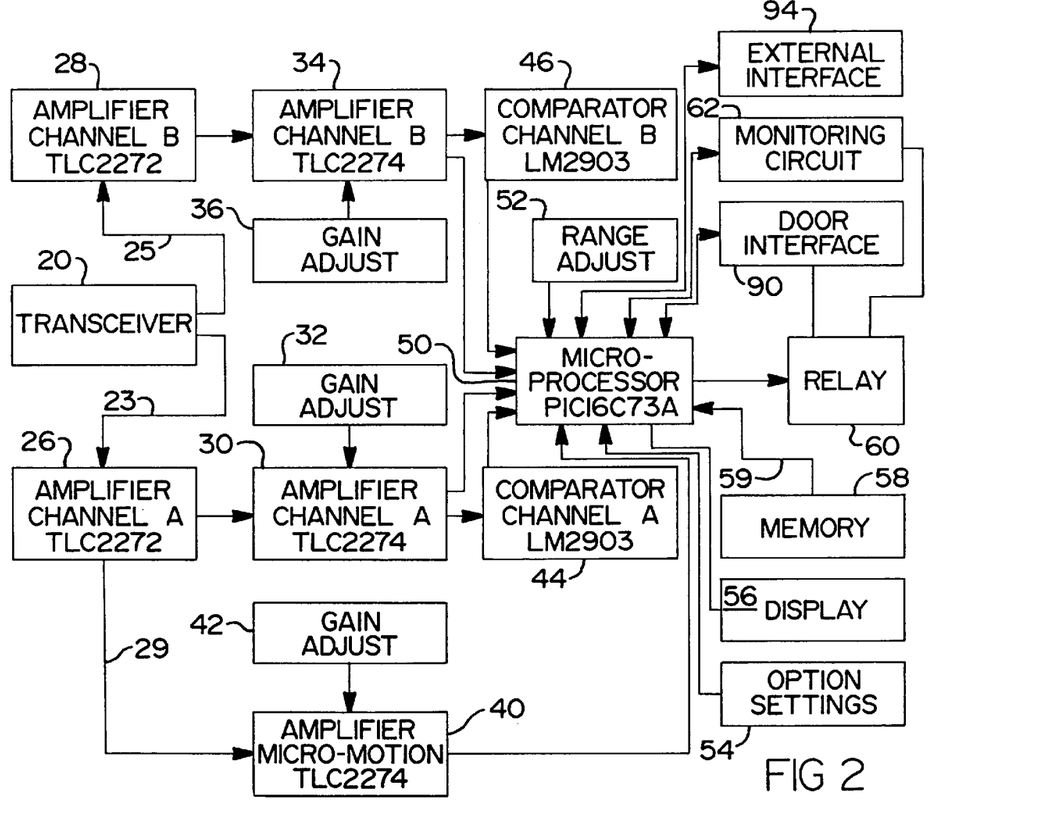
FIG. 2 is a block diagram of the circuit for implementing the motion sensor according to the preferred embodiment of the present invention.

With reference now to FIG. 2, a block diagram discloses the circuit associated with motion sensor 10. More specifically, motion sensor 10 is designed as a field disturbance sensor intended for use under FCC Rules, Part 15. As such motion sensor 10 includes a transceiver 20 for generating the microwave signal 21. Preferably, transceiver 20 is an 86843 series CW, K-Band doppler transceiver manufactured by M/A-COM, Inc. and designed for commercial applications in directional motion sensing. As disclosed, transceiver 20 includes a Gunn diode oscillator for transmitting microwave signal 21, and two Schottky diode mixers for receiving the microwave signal 21 reflected from the target. The Gunn diode and Schottky mixers are assembled into a diecast waveguide package. The Schottky diode mixers comprise a channel A receiver 22 and a channel B receiver 24 for producing a channel A signal and a channel B signal which are phase shifted from one another. These phase shifted signals are then conditioned to produce motion and directional signals which are analyzed by motion sensor 10.

Through use of the doppler effect, the channel A and channel B receivers 22, 24 generate the two IF output signals having frequencies which are proportional to the velocity of the target, and differences in phase which depend on the direction of motion, toward or away from transceiver 20. If the motion is toward transceiver 20, the signal produced by the channel A receiver 22 will lead the signal produced by the channel B receiver 24 by approximately 90 degrees. If the motion is away from transceiver 20, the signal produced by the channel B receiver 24 will lead the signal produced by the channel A receiver 22 by approximately 90 degrees. The frequency of the signals produced by transceiver 20 for an average person moving at 1.5 feet per second within the range of motion sensor 10 is approximately 72 Hz. Additionally, the amplitude of the two IF output signals is proportional to the amount of the signal reflected by the target, and is further indicative of the size and/or proximity of the target.

With continued reference to FIG. 2, the channel A output 23 of transceiver 20 is provided to a first stage amplifier 26, and the channel B output 25 of transceiver 20 is provided to a first stage amplifier 28. Preferably amplifiers 26, 28 are implemented using a TLC2272 operational amplifier having a gain constant of approximately 100. The output of the channel A amplifier 26 is provided to a second stage amplifier 30, which includes a gain adjustment circuit 32. Likewise, the output from the channel B amplifier 28 is provided to a second stage amplifier 34 which also includes a threshold adjustment circuit 36.

A second output 29 from the first stage amplifier 26 is provided to a micro motion amplifier 40 which also includes its own gain adjustment circuit 42. Output 29 provides transmission of the micro motion signal (discussed in more detail below) to a separate signal conditioning circuit having a lower frequency response. As disclosed, amplifiers 30, 34 and 40 are each implemented using one of the four operational amplifiers provided on a single integrated circuit, part No. TLC2274. The gain adjustment circuits 32, 36, 42 are preferably implemented using a manually operated potentiometer connected to each amplifier. Preferably, gain adjustment circuits 32, 36, 40 are used during the manufacturing process to adjust the gain of their associated amplifier circuit to account for variances between the hardware components; especially the transceiver.

The output from the channel A amplifier 30 is provided to a channel A comparator circuit 44. Likewise, the output from channel B amplifier 34 is provided to a channel B comparator circuit 46. As disclosed, comparators 44 and 46 are each implemented using one of the voltage comparators provided on a single integrated circuit; part No. LM2903. In an alternate embodiment, the hardware forming comparators 44, 46 can be eliminated, and their function can be implemented with software executed within microprocessor 50. In this alternate embodiment, the analog signals 72, 76 from amplifiers 30, 34 are sampled by microprocessor 50 on lines 74, 78, and the control algorithm determines inbound and outbound direction from these digitized signals. The software control algorithm then determines whether the digitized signals exceed the predetermined voltage threshold for determining whether motion is present.

The digital output from each comparator 44, 46 is provided to a microprocessor 50, and the analog output from each amplifier 30, 34 is also provided to microprocessor 50. Preferably, microprocessor 50 is that available under Part No. PIC16C73A, manufactured by Microchip. Microprocessor 50 provides a plurality of inputs for receiving analog signals which are then internally sampled by an A/D converter (not shown) for further processing by the control algorithm. Microprocessor 50 also includes a series of digital inputs for receiving previously digitized or purely digital signals. Microprocessor 50 is responsible for implementing the control algorithm which is stored and executed from an internal memory.

The output of micro motion amplifier 40 is also provided to one of the analog inputs of microprocessor 50. However, it should be noted that the signal output from micro motion amplifier 40 is not digitized by a comparator circuit as with the signal output from amplifiers 30, 34. This is so that microprocessor 50 can directly digitize and analyze the amplified micro motion signal provided by micro motion amplifier 40 for the presence of micro motion, or very small levels of motion within in the range of motion sensor 10.

Microprocessor 50 includes a range adjustment circuit 52, which is preferably implemented with a manually operated potentiometer for changing the effective detection range of motion sensor 10. Motion sensor 10 also includes an option setting circuit 54 connected to microprocessor 50, and a display 56 for presenting real-time information associated with motion sensor 10. Preferably, display 56 is a series of LEDs, each responsible for indicating a separate state or function. However, display 56 could also include other types of displays including, but not limited to an LCD display or computer monitor.

A memory circuit 58 is connected to microprocessor 50 through a bidirectional serial interface 59. Memory circuit 58 is preferably used for storing default valves and preset valves used by microprocessor 50 during its initial power-up sequence. The primary output of microprocessor 50 is provided to a relay 60 for controlling automatic door 12. A monitoring circuit 62 works in conjunction with relay 60 and door interface 90 for detecting whether an external source or device has independently actuated automatic door 12. Examples of external sources are a separate presence sensor, or a manually actuated switch, such as a handicap switch for opening door 12. The operation of monitoring circuit 62 is discussed in more detail below. Microprocessor 50 is also provided with an external device interface 94, preferably a serial interface, which allows external devices to communicate with motion sensor 10.

Figure 3:
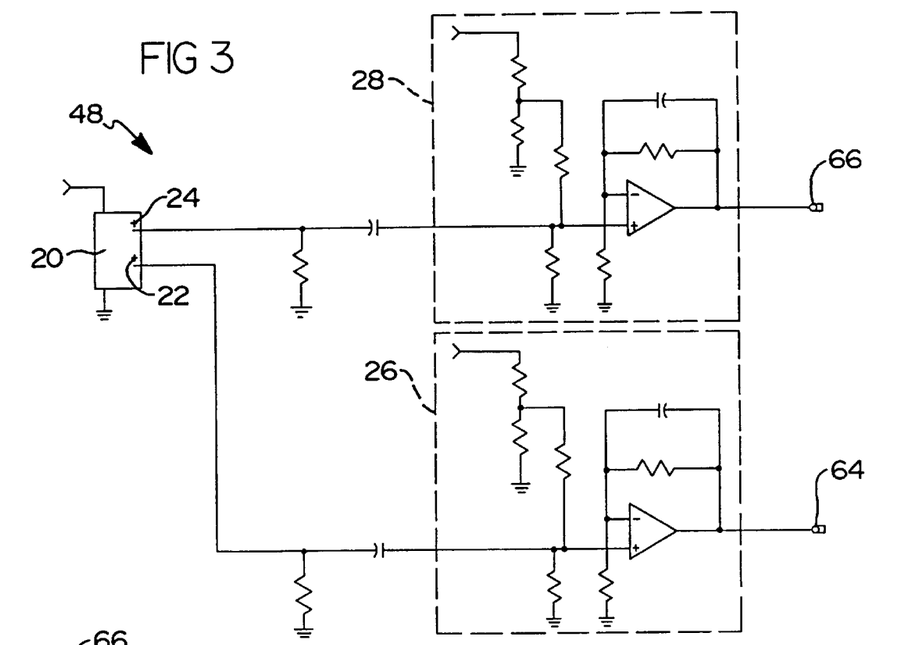
FIG. 3 is a schematic diagram of the transceiver and first stage signal conditioning circuit associated with the preferred embodiment of the present invention.

Referring now to FIG. 3, the schematic diagram of the preferred circuit for implementing the transceiver board 48 of motion sensor 10 is shown in more detail. As will be appreciated, the detailed components of several of the blocks represented in FIG. 2 are shown. More specifically, channel A and channel B Schottky diode receivers 22, 24 are shown as being connected to the inputs of the channel A and channel B first stage amplifier circuits 26, 28. As disclosed, transceiver 20 and amplifiers 26, 28 reside on their own circuit board 48 which serves to isolate these components and prevent electrical noise from being transmitted to subsequent signal conditioning circuit components. Circuit board 48 also allows the electronics of motion sensor 10 to be contained in a smaller enclosure because circuit board 48 can take on alternate orientations. Connector 64 couples the output of amplifier 26 to the input of second stage amplifier 30 and to the input of micro motion amplifier 40. Likewise, connector 66 couples the output of amplifier 28 to the input of second stage amplifier 34.

Figure 4:
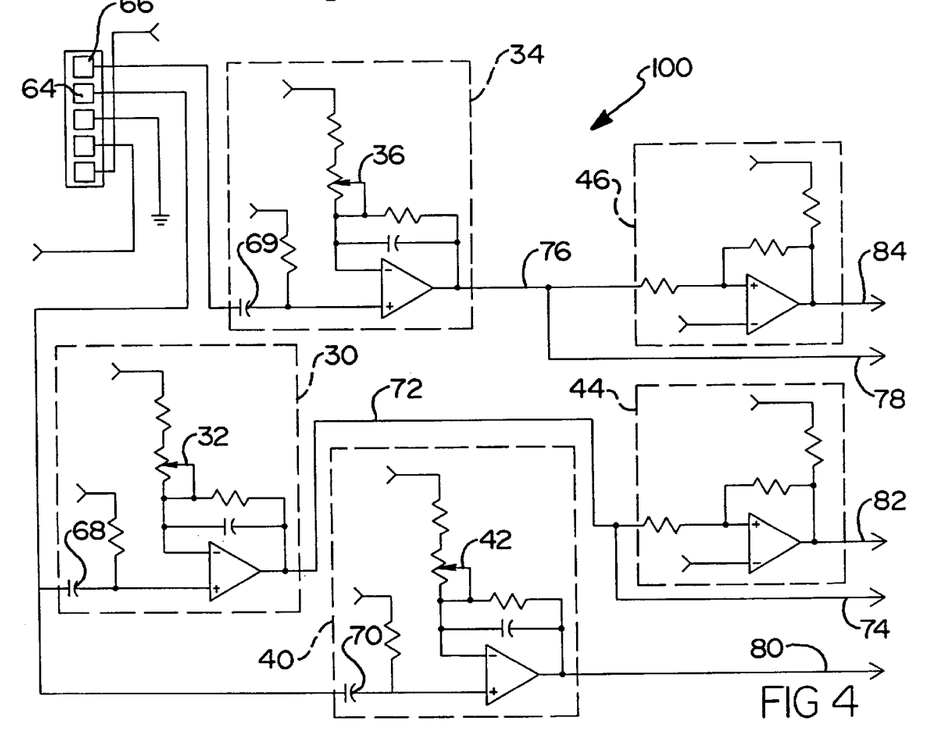
FIG. 4 is a schematic diagram of the second stage signal conditioning circuit according to the preferred embodiment of the present invention.

With reference now to FIG. 4, the details of signal conditioning circuit 100 are shown. As disclosed, each amplifier circuit 30, 34 and 40 includes a gain adjust circuit comprising a potentiometer 32, 36 and 42 (respectively) which allows the gain of each amplifier circuit 30, 34, 40 to be individually adjusted. Preferably, each gain adjust potentiometer 32, 36, 42 is a manually operated 50 KOhm potentiometer, which is adjusted during the manufacturing of motion sensor 10, and not made accessible for adjustment in the field. To further assist in the reduction of noise and the control of the frequency response, first stage amplifier 26 is connected to second stage amplifier 30 with a coupling capacitor 68, and first stage amplifier 28 is connected to second stage amplifier 34 with a coupling capacitor 69. First stage amplifier 26 is also connected to micro motion amplifier 40 with coupling capacitor 70. The capacitance values for coupling capacitors 68, 69 are preferably 0.1 $\mu$F. To allow for increased sensitivity to micro motion (smaller levels of motion), coupling capacitor 70 is preferably chosen to have a value of 4.7 $\mu$F which increases the low frequency response of micro motion amplifier 40.

In an alternate embodiment, micro motion amplifier 40 can be eliminated and the output of amplifier 30 directly connected to one of the digitizing analog inputs on microprocessor 50. When eliminating micro motion amplifier 40, the valve for coupling capacitor 68 is preferably chosen to be 4.7 $\mu$F for increasing the low frequency response of second stage amplifier 30. As part of this alternate design, analog output 72 from amplifier 30 is sampled and analyzed by microprocessor 50 on line 74 for the presence of micro motion.

FIG. 4 also discloses that amplifier 30 produces an analog channel A output 72 which is provided to comparator circuit 44. Comparator circuit 44 produces the digitized doppler A output signal on line 82. The analog channel A signal is provided to microprocessor 50 on line 74, and the digitized channel A signal from comparator 44 is provided to microprocessor 50 on line 82. Likewise, amplifier 34 produces an analog channel B output 76, which is provided to comparator circuit 46 for similar processing. Comparator circuit 46 produces the digitized doppler B output signal on line 84. The analog channel B signal is provided to microprocessor 50 on line 78, and the digitized channel B signal from comparator 46 is provided to microprocessor 50 on line 84. Finally, the micro motion amplifier circuit 40 produces the micro motion output signal 80, which is derived from the channel A first stage amplifier 26. As will be discussed in more detail below, the analog channel A output signal 74, analog channel B output signal 78, doppler A output signal 82, doppler B output signal 84, and micro motion output signal 80 are all provided to separate inputs of microprocessor 50.

The primary purpose of comparators 44, 46 is to compare its analog input signal against a 2.5V reference voltage and transform the analog input signal into a 0–5V digital signal for further processing. When the amplitude of the analog (sinusoidal) signal is above 2.5V, the output of comparators 44, 46 is 5V, and when the amplitude of the analog signal is below 2.5V, the output of comparators 44, 46 is 0V. Since the digital signals produced by comparators 44, 46 will be out of phase by approximately 90°, the processor can compare the lead or lag between the two signals for determining the direction of the target toward or away from motion sensor 10.

Figure 5:
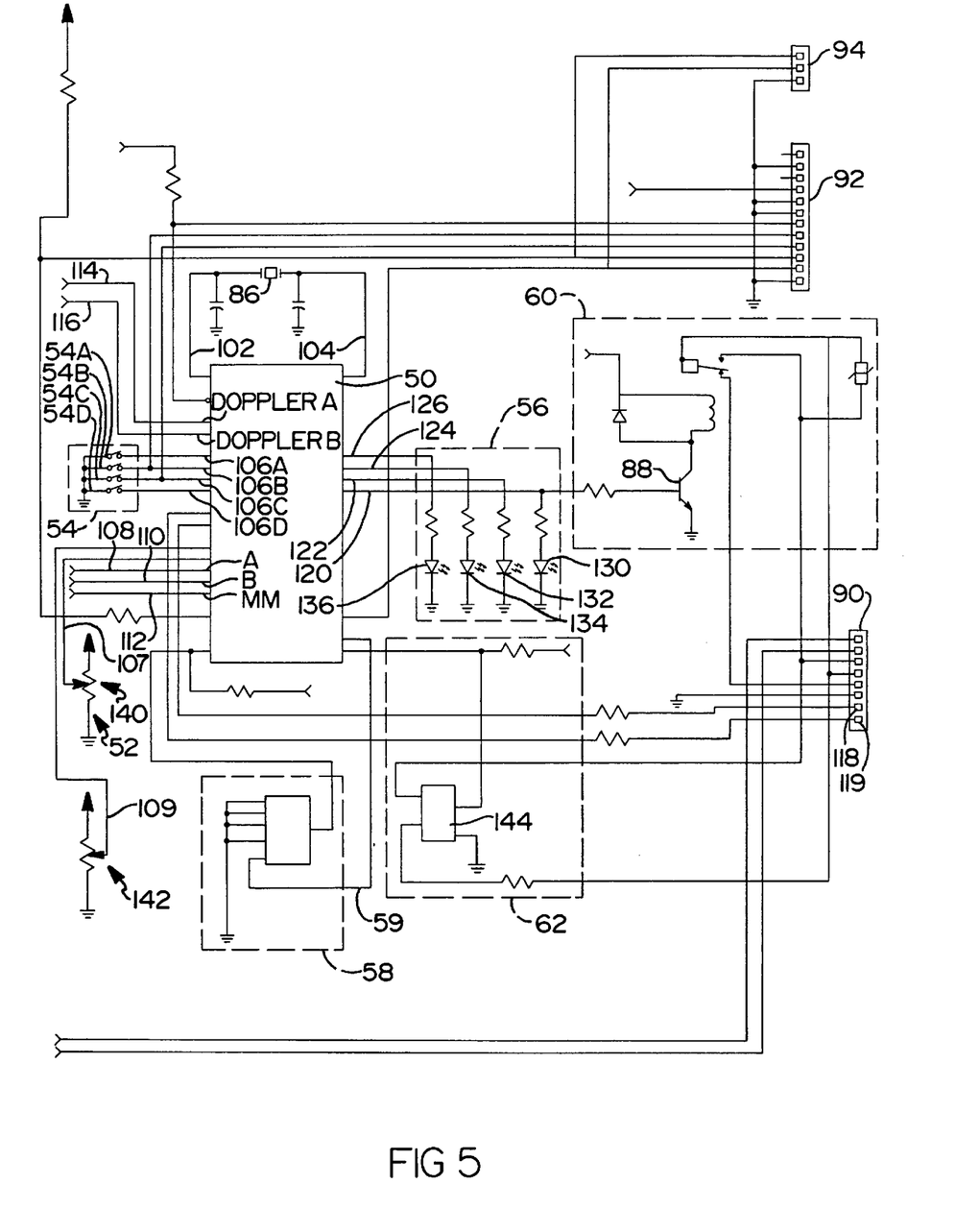
FIG. 5 is a schematic diagram of the microprocessor and control circuitry according to the preferred embodiment of the present invention.

With reference now to FIG. 5, the schematic diagram of the circuitry associated with microprocessor 50 is shown in more detail. As will also be appreciated, the detailed components of the remaining blocks represented in FIG. 2 are disclosed. More specifically, microprocessor 50 includes a plurality of inputs and outputs for receiving and transmitting various signals. Input 107 is connected to range adjustment circuit 52, which as disclosed is a 5 KOhm potentiometer 140. A second potentiometer 142 for producing a range of voltages is also connected to input 109 of microprocessor 50 which can be monitored by the control algorithm for implementing another customized setting. A 4 MHz oscillator 86 is connected between inputs 102 and 104 which assists in controlling the clock speed of the processor. Microprocessor 50 also includes option setting circuit 54, which is preferably a bank of DIP switches 54A, 54B, 54C, 54D, connected to inputs 106A, 106B, 106C, 106D. In the preferred embodiment, option setting circuitry 54 includes four manually operated DIP switches. However, one skilled in the art will readily appreciate that a variety of circuits or interfaces can be used for controlling the options associated with microprocessor 50.

In operation, closing switch 54A will increase the sensitivity of the motion sensor 10 to the presence of micro motion when the control algorithm is in the micro motion detection state. Closing switch 54B increases the sensitivity of the motion sensor 10 to any motion when the system is in the ready or standby mode (default mode). Closing switch 54C reduces the time duration for micro motion analysis after relay 60 becomes inactive from five (5) seconds to two (2) seconds. Finally, closing switch 54D changes the control algorithm from operating in the unidirectional motion sensing mode to operating in the bidirectional motion sensing mode.

The primary inputs to microprocessor 50 are the inputs for receiving the conditioned motion and micro motion signals from signal conditioning circuit 100. More particularly, input 108 receives the analog channel A signal from line 74, and input 110 receives the analog channel B signal from line 78. The analog micro motion signal from amplifier circuit 40 is received by input 112 from line 80. Finally, input 114 receives the digital doppler A signal from line 82, and input 116 receives the digital doppler B signal from line 84. Additionally, microprocessor 50 includes a pair of inputs 118, 119 for receiving signals generated by a door position encoder (not shown) through door interface 90.

The primary output of microprocessor 50 is output 120 which activates and deactivates relay circuit 60 through power transistor 88 for opening and closing door 12, and controlling relay LED 130. Preferably, relay LED 130 emits red light to indicate that relay 60 is active, and is off when relay 60 is inactive. Three other outputs from microprocessor 50 are also connected to LEDs. More specifically, output 122 is connected to a yellow LED 132 to indicate the presence of micro motion, output 124 is connected to a yellow LED 134 to indicate the presence of normal motion and fast motion, and output 126 is connected to a green LED 136 to indicate that motion sensor 10 is in the ready state. These outputs are activated by the control algorithm disclosed below.

Monitoring circuit 62 includes an opto-isolator 144 connected between microprocessor 50 and relay circuit 60 for detecting whether an external source or device has independently actuated automatic door 12. In operation, a small amount of current within monitoring circuit 62 will be detected by opto-isolator 144 when no external devices are trying to open door 12. However, this current level will drop or disappear when the external source (e.g., separate presence sensor, manually operated switch) attempts to open door 12. This drop in current is detected by opto-isolator 144 for producing a change in voltage, which can be monitored by microprocessor 50. Accordingly, the control algorithm is able to detect when an external source is attempting to open door 12. Motion sensor 10 also includes a test connector 92 which is used during production for testing and programming microprocessor 50.

Figure 6:
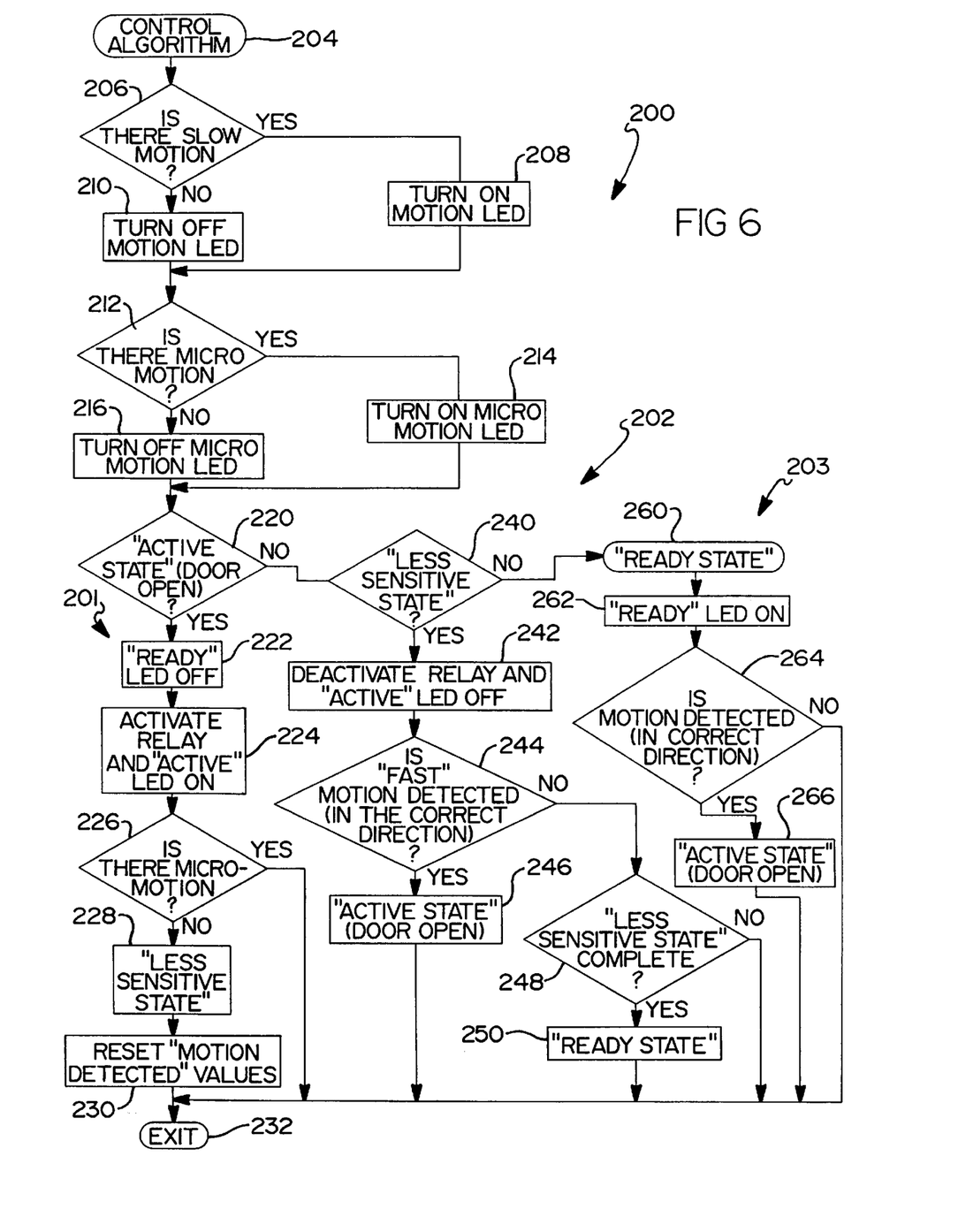
FIG. 6 is a flowchart of the control algorithm according to the preferred embodiment of the present invention.

Turning now to FIG. 6, the flowchart for implementing the control algorithm which operates relay 60 and display 56 is shown in more detail. As will be appreciated by one skilled in the art, the most significant feature of motion sensor 10 is the ability to adaptively increase its sensitivity level for detecting micro motion while door 12 is open (relay 60 active). This feature will maintain the door 12 in the open position for as long as micro motion is detected. It should be understood that the threshold for detecting normal levels of motion is approximately two inches/second of movement in a direction normal to the sensor. However, the threshold for detecting micro motion is approximately one-eighth of an inch/second of movement in a direction normal to the sensor.

In operation, motion sensor 10 continually scans for motion. If motion of the target exceeding a preset threshold, and moving in the correct direction, is detected while in the normal sensitivity state, relay 60 is switched on, and automatic doorway 12 is opened. While doorway 12 remains open, the control algorithm changes operating modes and increases the sensitivity level of motion sensor 10 for detecting micro motion, or motion levels which are smaller than those motion levels required for triggering motion under normal sensitivity. Smaller levels of motion produce a signal having a relatively lower frequency. Scanning for micro motion will continue until micro motion is no longer present.

When micro motion is absent for a time interval determined by switch 54C, the control algorithm switches modes and decreases the sensitivity level of motion sensor 10 for detecting only fast motion, or motion levels which are larger than those motion levels required for triggering motion under normal sensitivity. Faster levels of motion produce a signal with relatively higher frequency. This decrease in motion sensitivity prevents the closing motion of door 12 from triggering the reopening of the door 12. Thus, the decreased sensitivity allows the door 12 to completely close unless a fast level of motion is detected (such as a pedestrian moving quickly toward a partially closed doorway 14). Once door 12 is completely closed, the control algorithm resets the motion sensitivity level to normal sensitivity and again begins continually scanning for normal levels of motion.

More specifically, microprocessor 50 scans for normal levels of motion by comparing the relative phase shift between the digital doppler signals provided by comparator circuits 44, 46 on inputs 114, 116. For example, if the sequence of the digital doppler signals is: rise on input 114 (channel A), rise on input 116 (channel B), fall on input 114, fall on input 116, motion toward transceiver 20 is detected. If the sequence of the digital doppler signals is: rise on input 116 (channel B), rise on input 114 (channel A), fall on input 116, fall on input 114, motion away from transceiver 20 is detected. Microprocessor 50 is also monitoring the amplitude of the analog signal received from second stage amplifier 30 on input 108. If the voltage of the analog signal on input 108 exceeds the threshold voltage provided on input 107 by range adjustment circuit 52, and one of the rise/fall sequences of the digital doppler signals is detected, the control algorithm determines that one motion "hit" has occurred. The control algorithm continues monitoring and counting the number of motion hits. When the number of motion hits exceeds a predetermined number, the control algorithm determines that normal levels of motion are present. Accordingly, the threshold for a desired motion sensitivity level can be adjusted by changing the number of motion hits used by the control algorithm for determining whether motion at that desired level is present. Moreover, the control algorithm of the present invention is able to automatically change the required number of motion hits for switching between the various sensitivity level operating modes.

Faster levels of motion are detected in the same fashion as normal levels of motion. However, the combination of correct detected direction and high voltage level must occur a greater number of times, thus generating a greater number of motion hits. If this analog signal voltage level on input 108 exceeds the threshold voltage on input 107 and the correct direction is detected for greater than the predetermined number of occurrences, the control algorithm determines that faster levels of motion are present.

The control algorithm analyzes the input signals for micro motion using a different technique. Micro motion is detected by continuously sampling the analog signal provided by micro motion amplifier 40 on microprocessor input 112. The control algorithm examines the analog micro motion signal for maximum and minimum values over a given time period. When the difference between the maximum and minimum values exceeds a predetermined threshold (selected via switch 54A), the control algorithm determines that micro motion is present. The control algorithm does not analyze the digital doppler signals to determine the direction of the micro motion. Rather, the analog micro motion signal is analyzed for the occurrence of micro motion.

FIG. 6 discloses the relay control section of the control algorithm described above. The relay control algorithm 200 includes three primary execution branches. The first branch 201 controls the activation of the relay 60 and the detection of micro motion. The second branch 202 controls the relay 60 after the door 12 is open and micro motion is no longer detected. Second branch 202 also detects for faster levels of motion. The third branch 203 controls motion sensor 10 during the ready state, or default state and detects for normal levels of motion.

The primary variable associated with the relay control algorithm is the RELAY STATE variable, which has three possible values or states; READY, ACTIVE, and WAIT. The relay control algorithm 200 is constantly checking and updating the status of the RELAY STATE variable in a loop fashion. During the power-up and self-test sequence, the value of RELAY STATE is set to READY. The algorithm 200 begins at oval 204 and continues with diamond 206 which determines whether normal levels of motion have been detected. If normal levels of motion are present and the value of RELAY STATE is ACTIVE, block 208 turns on yellow motion LED 134. If normal levels of motion are not present, block 210 turns off motion LED 134. Next, diamond 212 determines whether micro motion has been detected. If micro motion is detected, block 214 turns on yellow micro motion LED 132. If micro motion is not detected, block 216 turns off micro motion LED 132.

Execution of first branch 201 continues with diamond 220 which determines the value of RELAY STATE. If RELAY STATE is ACTIVE, execution of the first branch 201 continues. If RELAY STATE is any value other than ACTIVE, control passes to diamond 240 which again determines the value of RELAY STATE. If RELAY STATE is set to WAIT, the second branch 202 is executed. Otherwise, if RELAY STATE is READY, then the third branch 203 is executed starting at oval 260.

During third branch 203 execution, block 262 turns on green LED 136 to indicate that motion sensor 10 is in the ready state for detecting normal levels of motion. Next, diamond 264 determines whether normal levels of motion are present by examining the number of motion hits generated. If normal levels of motion are detected by motion sensor 10, the value of RELAY STATE is set to ACTIVE by block 266, and control ends at oval 232. If the requisite number of motion hits are not generated, control will end at oval 232, and the loop will be restarted at oval 204. Accordingly, relay control algorithm 200 will remain in the ready state until the predetermined number of motion hits are detected.

When the value of RELAY STATE is set to ACTIVE, block 208 turns on yellow motion LED 134, and diamond 220 passes control to block 222 which turns off green LED 136. Next, block 224 activates relay 60 for opening door 12 and turns on relay LED 130. The algorithm then scans for the presence of micro motion at diamond 226 by examining the micro motion threshold. If micro motion is detected, oval 232 will exit and return control to oval 204 and block 214 will turn on micro motion LED 132. Accordingly, the algorithm 200 and relay 60 will stay in the ACTIVE mode until the control algorithm no longer detects the presence of micro motion after analyzing the signal on input 112. When micro motion is no longer detected at decision point 226, RELAY STATE is updated to WAIT by block 228, and motion detection variables within the control algorithm are cleared by block 230. Again, oval 232 will exit and return control to starting oval 204. Block 216 will then turn off micro motion LED 132.

When the value of RELAY STATE is set to WAIT (block 228), the decision made at diamond 240 passes control to the second branch 202 of control algorithm 200. Next, block 242 deactivates relay 60 and door 12 begins closing automatically. The control algorithm then decreases the sensitivity level of motion sensor 10 for detecting only fast motion while the door 12 is closing. As described above, this decrease in sensitivity level is achieved by increasing the requisite number of motion hits for triggering fast motion in the correct direction. Diamond 244 represents the scanning for the presence of fast motion. At this point, control algorithm 200 will only reopen the door if faster levels of motion are detected. This is so that the motion of the closing door will not trigger reopening of the door. If fast motion is detected at 244, RELAY STATE is set to ACTIVE by block 246, oval 232 will exit and return control to oval 204, and the first branch 201 will be executed for reopening the door 12.

If fast motion is not detected at diamond 244, control is passed to diamond 248 which determines whether the less sensitive state (detecting only fast motion) is complete. This decision at 248 can be implemented in a variety of ways. Preferably, the door actuator (not shown) provides microprocessor 50 with a signal through door interface 90 that door 12 is completely closed. However, a wait timer could also be used for determining the length of the less sensitive state. Accordingly, motion sensor 10 will scan for fast motion in the less sensitive state only during the time it takes door 12 to close. Until the signal indicating a completely closed door is received by diamond 248, oval 232 will exit and return control to oval 204, and the second branch 202 will continue to be executed until either fast motion is detected, or the door closed signal is received. Alternatively, this loop will continue until the wait timer expires. When the door closed signal is received, execution block 250 will set RELAY STATE to READY, oval 232 will exit and return control to oval 204, and the third branch 203 will be executed for monitoring normal levels of motion for triggering the reopening the door 12.

Figure 7:
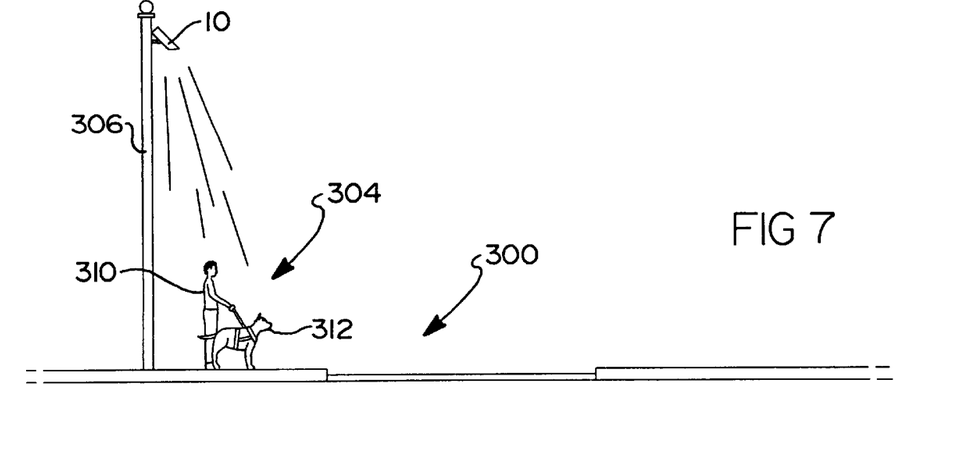
FIG. 7 is an elevation view of the motion sensor utilized within a pedestrian crossing environment according to an alternate preferred embodiment of the present invention.
Figure 8:
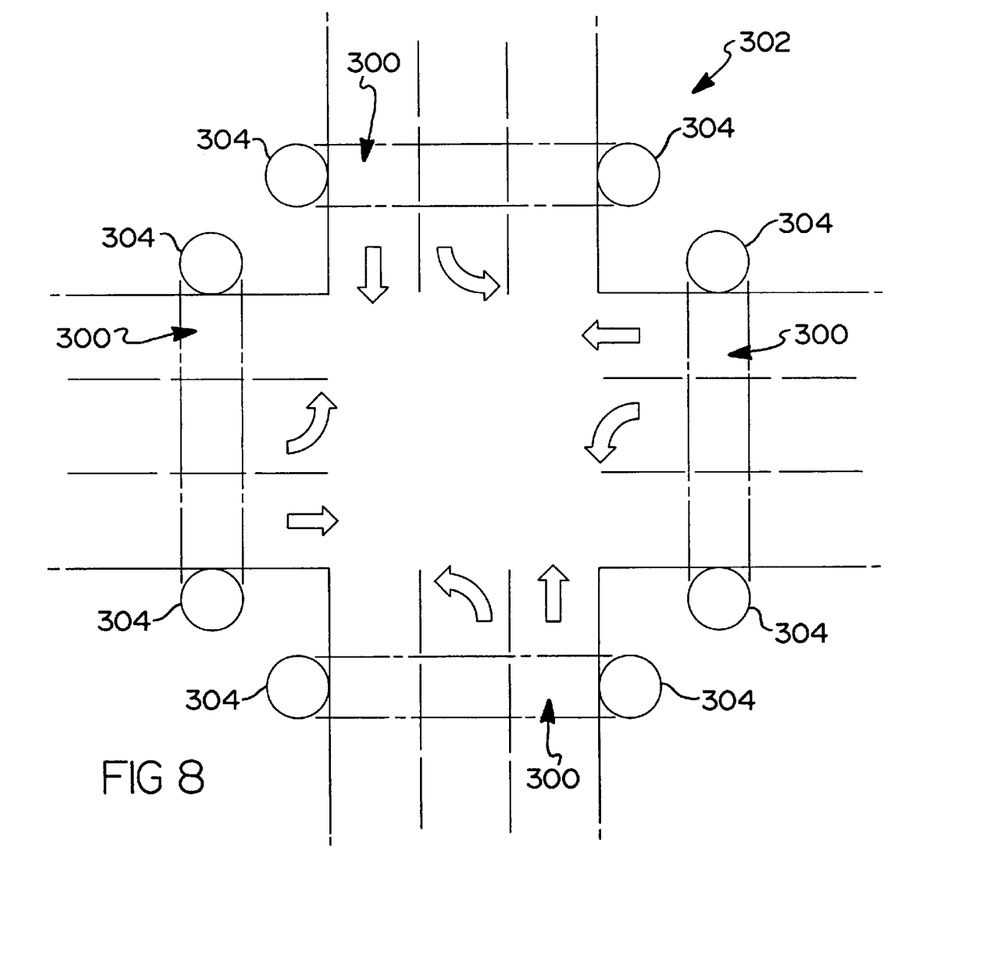
FIG. 8 is a plan view showing the various detection zones generated by a plurality of motion sensors at the pedestrian crossing areas, also according to an alternate preferred embodiment of the present invention.

Turning now to FIGS. 7 and 8, motion sensor 10 is shown in accordance with an alternate preferred embodiment of the present invention. As disclosed, motion sensor 10 may also be used for detecting a pedestrian 310 waiting to enter a pedestrian crosswalk 300 at a traffic intersection 302. in this alternate application, motion sensor 10 is mounted above a pedestrian detection zone 304 on a pole 306. The detection pattern of motion sensor 10 is focused into the pedestrian detection zone 304, adjacent crosswalk 300. In operation, the motion of pedestrian 310 entering detection zone 304 will be detected by motion sensor 10. As previously discussed, motion sensor 10 is capable of detecting micro motion, or very small levels of motion. Motion sensor 10 is also integrated with the traffic control system for intersection 302 so that when even the slightest motion of a pedestrian 310 moving within detection zone 304 is detected, motion sensor 10 can signal the traffic control system for changing the appropriate traffic lights and alerting the pedestrian 310 to begin crossing the road. Signaling the traffic control system may be accomplished through microprocessor output 120 as described above.

This alternative application for motion sensor 10 is particularly well suited for handicapped pedestrians, and especially blind pedestrians accompanied by a leader dog 312. Leader dogs for the blind are trained to direct their owners to the center of the edge of the crosswalk, not to the currently used crossing signal activation switch located somewhere near the crosswalk. Because standards do not currently exist for the location of the crossing signal activation switch, this application for motion sensor 10 eliminates the need for the blind pedestrian 310 to seek out the crossing switch.

Figure 9A:
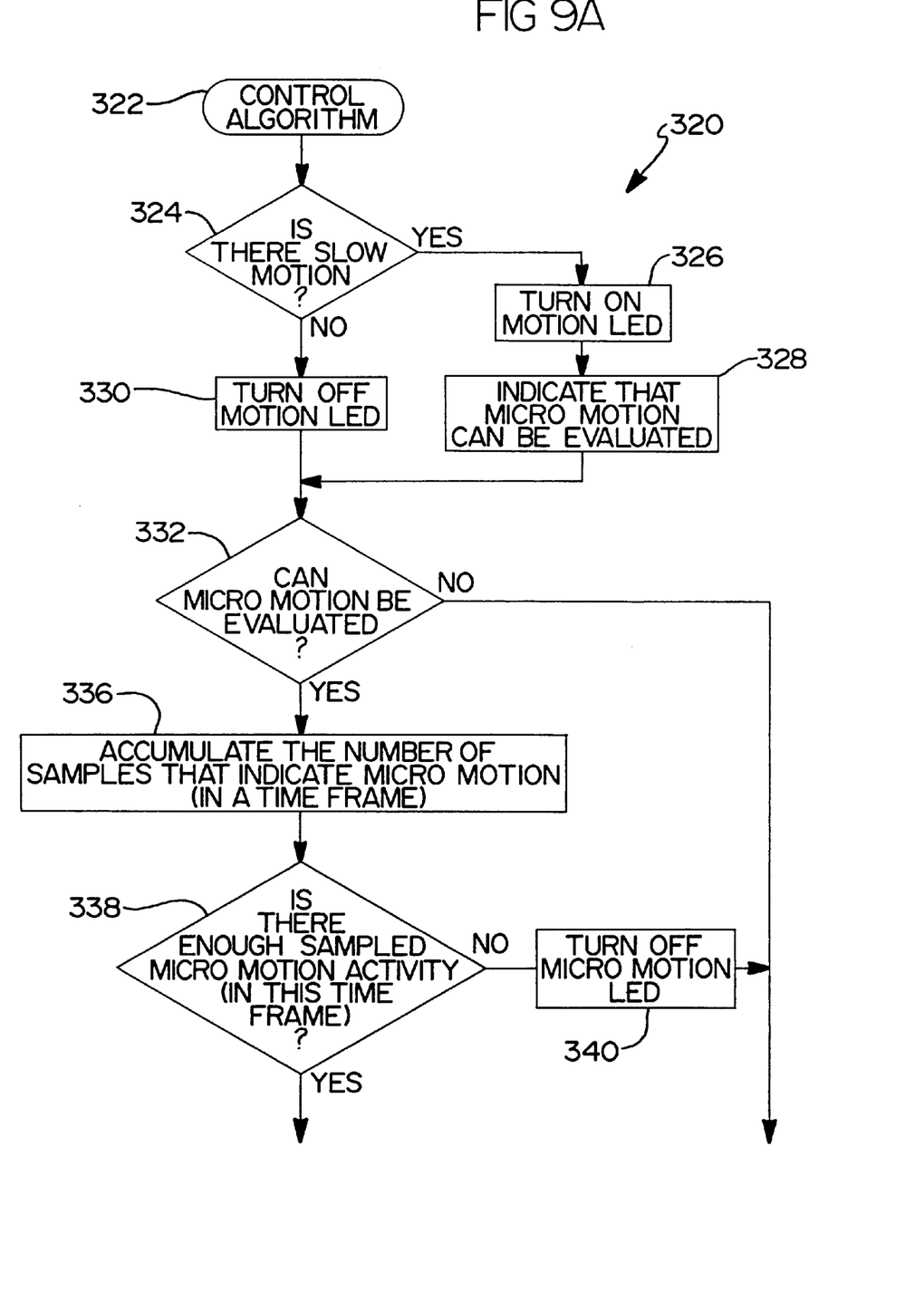
FIG. 9 is a flowchart of the control algorithm associated with the alternate preferred embodiment of the present invention.
Figure 9B:
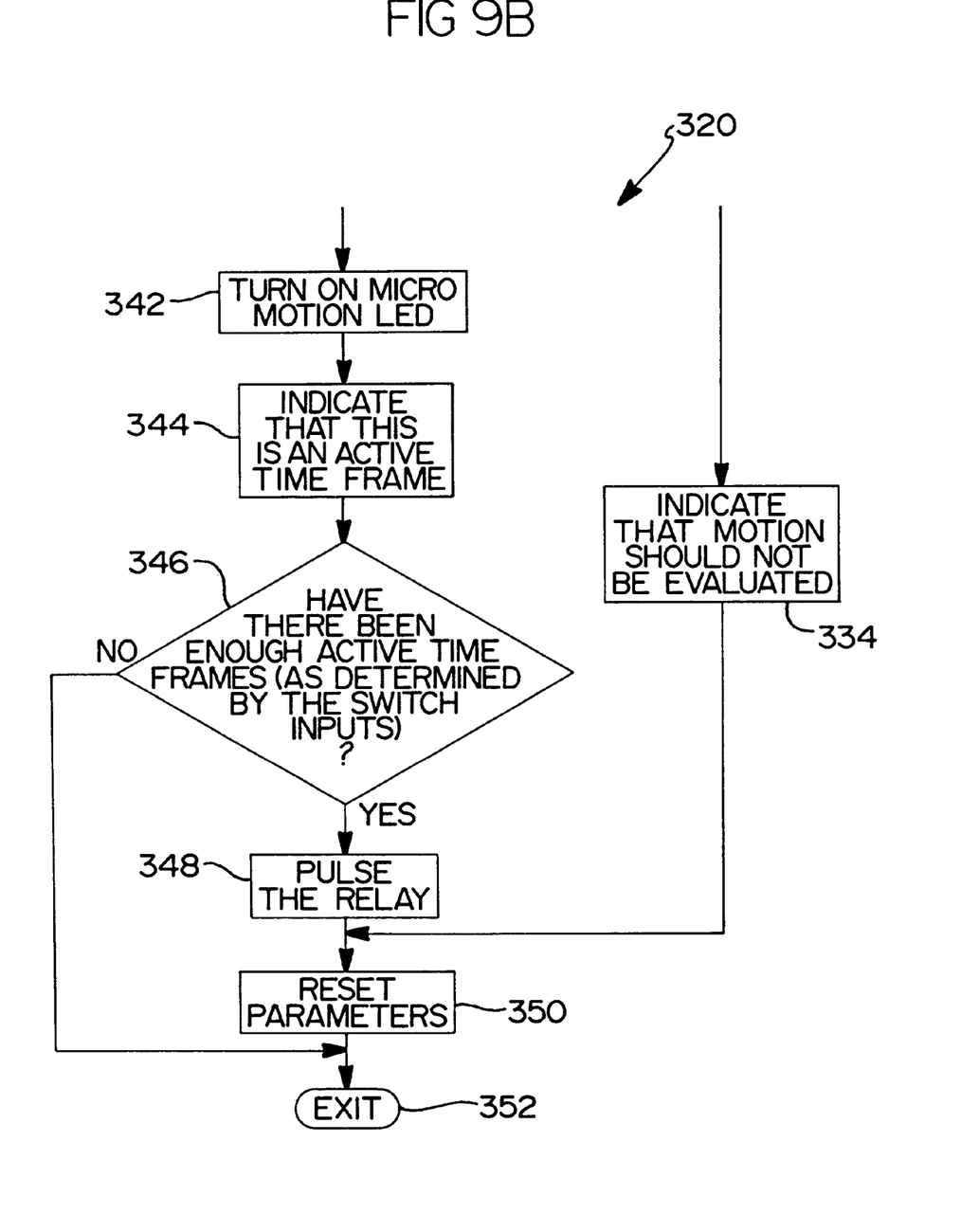

Turning now to FIG. 9, the flowchart for implementing the control algorithm associated with the alternate preferred embodiment of motion sensor 10 is shown in more detail. In this alternate application, motion sensor 10 continually scans for normal levels of motion. Once normal levels of motion have been detected, motion sensor 10 switches into the micro motion detection mode. If motion sensor 10 detects micro motion from a pedestrian 310 standing within detection zone 304, relay 60 is activated for notifying the traffic control system that a pedestrian is waiting to enter crosswalk 300. If micro motion is not detected within a predetermined amount of time, the control algorithm resets to the ready mode for detecting normal levels of motion. As part of this alternate embodiment, normal levels of motion are detected in substantially the same manner described above. However, the technique for detecting micro motion is modified for this crosswalk application and is described in more detail below.

With specific reference to FIG. 9, control algorithm 320 begins at oval 322 and continues with diamond 324 which determines whether normal levels of motion have been detected by analyzing whether the requisite number of motion hits have been accumulated. If normal levels of motion are detected, block 326 turns on yellow motion LED 134. Block 328 then sets a flag variable indicating that micro motion can be evaluated. If normal levels of motion are not detected, block 330 turns off motion LED 134. Next, diamond 332 examines the micro motion flag variable. If the flag variable is not set, block 334 resets the flag variable, block 350 resets the parameters of control algorithm 320, and control ends at oval 352. The control algorithm loop then begins at oval 322.

If diamond 332 determines that motion can be evaluated, the micro motion detection scheme is executed by block 336. The micro motion detection scheme operates by sampling the analog micro motion signal on input 112 over a given time period, thereby creating a micro motion time frame. As part of this process, the micro motion time frame is filled with micro motion samples. Preferably, one time frame includes ten (10) micro motion samples. Diamond 338 determines whether enough samples within one time frame indicate the presence of micro motion. For example, if four (4) samples out of ten (10) satisfy the voltage level requirement, the time frame indicates the presence of micro motion. However, it should be understood that the number of samples out of ten may be changed for specific applications. If diamond 338 determines that micro motion is present, block 342 turns on micro motion LED 132 and block 344 increments a micro motion time frame counter by one. If diamond 338 determines that micro motion is not present within the time frame, block 340 turns off micro motion LED 132, block 334 resets the micro motion flag variable, block 350 resets the algorithm parameters and control ends at oval 352.

After at least one micro motion frame has been detected, diamond 346 determines whether enough consecutive micro motion time frames have been successfully detected. The preferred number of consecutive time frames is three (3). However, the number of consecutive micro motion time frames may be selected through option setting circuit 54. If three consecutive time frames are not detected, control passes to oval 352 and control algorithm 320 is reexecuted for continuing the micro motion detection scheme. If the requisite number of time frames are detected, relay 60 is activated by block 348 and the traffic control system is notified that a pedestrian is waiting to enter crosswalk 300. The algorithm parameters, including the time frame counter, are reset by block 350, and oval 352 will exit and return control to oval 322.

The control algorithm for this alternate embodiment is designed to ignore pedestrians passing completely through the detection zone 304, and triggering the pedestrian crossing signal only when a pedestrian is waiting to cross. This is accomplished by switching into the micro motion detection mode after normal levels of motion are detected. While in the micro motion detection mode, faster levels of motion are ignored when the micro motion time frame samples are evaluated at 338. Thus, only motion samples in the time frame which are less than the normal motion voltage level, and greater than the no motion voltage level are considered to be micro motion samples generated by a waiting pedestrian. This technique allows motion produced by a pedestrian moving through detection zone 304 and not stopping or waiting to be ignored by motion sensor 10. Accordingly, this application of motion sensor 10 eliminates the search for the activation switch by automatically detecting any pedestrian entering and standing within detection zone 304.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A microwave motion sensor for detecting multiple levels of motion of a target comprising:

a transceiver for broadcasting a signal into a predetermined area and receiving a reflected signal for producing first and second directional signals;

a signal conditioning circuit for amplifying the first and second directional signals and digitizing the directional signals, said signal conditioning circuit including a micro motion amplifier for separately amplifying one of the directional signals and producing a micro motion signal;

a processor for receiving the first and second directional signals transmitted by the signal conditioning circuit, and for receiving the micro motion signal, said processor including means for comparing the first and second directional signals; and means for analyzing the micro motion signal by digitizing the micro motion signal at a resolution greater than the first and second directional signals are digitized to produce a high resolution signal;

said processor defining a first mode in which motion is detected based on the first and second directional signals, and a second mode in which motion is detected based on the high resolution signal;

said processor automatically switching from the first mode to the second mode when motion is detected during the first mode.

2. The microwave motion sensor of claim 1 wherein motion is detected in the first mode by analyzing the relative phase shift between the first and second directional signals and the voltage level of one of the first and second directional signals.

3. The microwave motion sensor of claim 1 wherein motion is detected in the second mode by analyzing the micro motion signal for levels of motion exceeding approximately one eighth of an inch per second.

4. The microwave motion sensor of claim 3 wherein the micro motion signal is analyzed by calculating a difference between a maximum voltage level and a minimum voltage level, and wherein a motion event is triggered when the difference between the maximum voltage level and the minimum voltage level exceeds a micro motion threshold.

5. The microwave motion sensor of claim 3 wherein the micro motion signal is analyzed by examining a plurality of voltage signal samples over a predetermined time frame and calculating a number of voltage signal samples within a given range, and wherein a motion event is triggered when the number of voltage signal samples exceeds a motion threshold.

6. The microwave motion sensor of claim 1 including a circuit for adjusting the operating range of the motion sensor for detecting motion.

7. The microwave motion sensor of claim 1 including a display for presenting information relating to the current operating mode of the motion sensor.

8. The microwave motion sensor of claim 7 wherein the display is a plurality of LEDs.

9. The microwave motion sensor of claim 1 including an interface connected to the processor for communication with an external device.

10. The microwave motion sensor of claim 1 including a memory for storing an array of information for use by the processor.

11. The microwave motion sensor of claim 1 including an option setting circuit for changing a set of predetermined thresholds associated with the processor.

12. A microwave motion sensor for detecting multiple levels of motion of a target comprising:

a transceiver for broadcasting a microwave signal into a predetermined area and receiving a reflected signal with a two-channel receiver for producing first and second doppler signals, the doppler signals representing directional motion of the target within the predetermined area;

a signal conditioning circuit having first and second circuits for amplifying the doppler signals and digitizing the doppler signals above a predetermined signal threshold level, the signal conditioning circuit including a micro motion amplifier having a frequency response lower than the first and second circuits for separately amplifying one of the doppler signals and producing an analog micro motion signal;

a processor for receiving the doppler signals generated by the signal conditioning circuit, and for receiving the micro motion signal, said processor including means for comparing the relative phase of the first and second doppler signals, and an algorithm for analyzing the micro motion signal;

the processor automatically switching between a first mode for detecting a first threshold level of motion, a second mode for detecting a second level of motion, the second level of motion being slower than the threshold level of motion, and a third mode for detecting a third level of motion, the third level of motion being faster than the threshold level of motion; and the algorithm evaluating the micro motion signal for maximum and minimum voltage values over a given time period and calculating a differential voltage value between the maximum and minimum voltage values, and the algorithm comparing the differential voltage value to a micro motion voltage threshold, wherein the second level of motion is detected when the differential voltage value is greater than the micro motion voltage threshold and the processor is operating in the second mode.

13. The microwave motion sensor of claim 12 wherein the first threshold level of motion is detected by analyzing the relative phase shift between the first and second doppler signals, and the voltage level of one of the first and second doppler signals for generating a series of motion hits, and wherein a motion event is triggered when the number of motion hits exceeds a motion threshold.

14. The microwave motion sensor of claim 12 wherein the second level of motion is detected by analyzing the micro motion signal for levels of motion exceeding approximately one eighth of an inch per second.

15. The microwave motion sensor of claim 12 wherein the signal conditioning circuit provides analog and digital doppler signals to the processor for analysis.

16. The microwave motion sensor of claim 12 including a circuit for adjusting the operating range of the motion sensor, said circuit providing a voltage signal to the processor for setting a threshold voltage level, and wherein one of the doppler signals is compared to the threshold voltage level to determine whether motion is detected.

17. A method for detecting multiple levels of motion of a target within a predetermined area comprising the steps of:

providing a microwave transceiver circuit for producing at least two phase-shifted doppler signals, and a micro motion signal in response to the motion of the target within the predetermined area;

providing a processor for comparing the relative phases of the doppler signals, and comparing the micro motion signal to a predetermined threshold;

said processor defining a first mode in which motion is detected based on the phase-shifted doppler signals, and a second mode in which motion is detected based on the micro motion signal;

scanning in the first mode for a threshold level of motion of the target by analyzing the doppler signals;

producing an event signal upon detecting the threshold level of motion; and automatically switching to the second mode for scanning for a second level of motion while the event signal is being produced, the second level of motion being less than the threshold level of motion.

18. The method of claim 17 further including the step of automatically switching to scanning for a third level of motion while the event signal is no longer being produced, the third level of motion being greater than the first level of motion.

19. The method of claim 17 further including the step of evaluating the micro motion signal for a maximum voltage level and a minimum voltage level, calculating a difference between the maximum voltage level and the minimum voltage level, and triggering a motion event when the difference exceeds a micro motion threshold.

20. A microwave motion sensor for detecting multiple levels of motion of a target and operating an automatic door in response to motion of said target, said microwave motion sensor comprising:

a transceiver for broadcasting a microwave signal into a predetermined area associated with the automatic door and receiving a signal reflected from the target with a two-channel receiver for producing first and second doppler signals, the doppler signals representing directional motion of the target within the predetermined area;

a signal conditioning circuit having first and second amplifier circuits for amplifying the doppler signals and first and second comparator circuits for digitizing the doppler signals;

a micro motion amplifier for receiving one of the first and second doppler signals, the micro motion amplifier having a frequency response which is lower than the frequency response of the first and second amplifier circuits for separately amplifying one of the doppler signals and producing an analog micro motion signal;

a processor defining a first detection mode in which motion is detected based on the doppler signals generated by the signal conditioning circuit, and a second detection mode in which motion is detected based on the analog micro motion signal;

said processor including a first algorithm operative in the first detection mode for comparing the relative phase of the first and second doppler signals, and analyzing the voltage level of one of the first and second doppler signals for detecting a threshold level of motion; and said processor including a second algorithm operative in the second detection mode for analyzing the analog micro motion signal for maximum and minimum voltage values over a given time period and calculating a differential voltage value between the maximum and minimum voltage values, the second algorithm comparing the differential voltage value to a micro motion voltage threshold, wherein a second level of motion is detected when the differential voltage value is greater than the micro motion voltage threshold, the second level of motion being slower than the threshold level of motion;

whereby in the first detection mode the processor opens the automatic door upon detecting the threshold level of motion and automatically switches into the second detection mode, and in the second detection mode the processor closes the automatic door when the differential voltage value is less that the micro motion voltage threshold for a predetermined amount of time.

* * * * *